US00RE42052E

(19) United States
(12) Reissued Patent
Osborn et al.

(10) Patent Number: US RE42,052 E
(45) Date of Reissued Patent: Jan. 18, 2011

(54) SYSTEM AND METHOD FOR MANAGING POWER OF PERIPHERAL COMMUNICATIONS BY AUTOMATICALLY CLOSING COMMUNICATIONS CHANNEL IMMEDIATELY AFTER FINISHING A COMMUNICATION WITH A PERIPHERAL DEVICE

(76) Inventors: Neal A. Osborn, Milpitas, CA (US); Jesse Earl Donaldson, Sunnyvale, CA (US)

(21) Appl. No.: 11/040,609

(22) Filed: Jan. 21, 2005

Related U.S. Patent Documents

Reissue of:
(64) Patent No.: 6,510,524
Issued: Jan. 21, 2003
Appl. No.: 09/379,552
Filed: Aug. 23, 1999

(51) Int. Cl.
*G06F 1/32* (2006.01)
*G06F 13/14* (2006.01)

(52) U.S. Cl. ..... 713/323; 710/14; 710/15; 710/16; 710/62

(58) Field of Classification Search ..... 713/323; 710/16, 62
See application file for complete search history.

(56) References Cited

U.S. PATENT DOCUMENTS 3,744,034 A 7/1973 Paul (Continued)

FOREIGN PATENT DOCUMENTS

EP 0 560 510 A1 * 9/1993

EP 0 560 510 9/1993

OTHER PUBLICATIONS

Gray, R. et al., "Efficient MC68HC08 programming: reducing cycle count and improving code density", Dr. Dobb's Journal, vol. 20, No. 5, May 1995, pp. 70–75.
Ruly, J. et al., "Handheld–to–Handheld Combat", Windows Magazine, No. 811, p. 55, Nov. 1997.
Dayton, D., "FRx extends reporting power of Platinum Series", PC Week, vol. 8, No. 5, p. 29(2), Feb. 1991.
Forbes, J. et al., "Palm PCs get a Big Hand (What's Hot)", Windows Magazine, No. 905, p. 96, May 1998.
Penwarden, M., "More Muscle for HP's OmniBook", Windows Magazine, No. 501, p. 110, Jan. 1994.
Feigel, C., "IBM, Motorola preview embedded PowerPCs; 403 and 505 processors combine strong performance with low cost", Microprocessor Report, vol. 8, No. 5, pp. 1–5, May 1994.
Bursky, D., "Evolving DSP Chips do more", Electronic Design, vol. 38, No. 23, pp. 51–59, Dec. 1990.

* cited by examiner

*Primary Examiner*—Thuan N Du

(57) ABSTRACT

An improved method and apparatus manages communications port contention and power consumption for a handheld computer, particularly handheld computers with a communications protocol that boosts power consumption when active, such as an RS-232 protocol. The improved method provides communications channel management that automatically opens the communications channel in response to a wake-up signal sent to a handheld computer from a peripheral device. The computer peripheral device is explicitly and/or implicitly identified. The opened communications channel is closed in response to receiving some data from the peripheral device, and/or after a device timeout expires without the handheld computer receiving data from the computer peripheral device.

45 Claims, 3 Drawing Sheets

U.S. PATENT DOCUMENTS 4,860,372 A 8/1989 Kuzunuki et al.
4,972,496 A 11/1990 Sklarew
5,231,381 A 7/1993 Duwaer
5,305,394 A 4/1994 Tanaka
5,349,668 A 9/1994 Gladstein et al.
5,389,745 A 2/1995 Sakamoto
5,434,929 A 7/1995 Beernink et al.
5,442,794 A 8/1995 Wisor et al.
5,444,192 A 8/1995 Shetye et al.
5,452,371 A 9/1995 Bozinovic et al.
5,528,743 A 6/1996 Tou et al.
5,534,892 A 7/1996 Tagawa
5,581,772 A 12/1996 Nanno et al.
5,615,284 A 3/1997 Rhyne et al.
5,621,817 A 4/1997 Bozinovic et al.
5,630,148 A 5/1997 Norris
5,664,204 A * 9/1997 Wang ..... 713/300
5,698,822 A 12/1997 Haneda
5,710,931 A 1/1998 Nakamura et al.
5,717,936 A 2/1998 Uskali
5,784,295 A 7/1998 Hinohara
5,841,901 A 11/1998 Arai et al.
5,915,002 A 6/1999 Shimosako
5,978,363 A 11/1999 Dimitrijevic et al.
6,112,249 A 8/2000 Bader et al.
6,138,245 A 10/2000 Son et al.
6,282,565 B1 8/2001 Shaw et al.
6,295,031 B1 9/2001 Wallace et al.
6,317,797 B2 11/2001 Clark et al.

SYSTEM AND METHOD FOR MANAGING POWER OF PERIPHERAL COMMUNICATIONS BY AUTOMATICALLY CLOSING COMMUNICATIONS CHANNEL IMMEDIATELY AFTER FINISHING A COMMUNICATION WITH A PERIPHERAL DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the field of handheld computers. In particular, the invention relates to managing a communications port of a handheld computer to help relieve power consumption and port contention.

2. Description of the Related Art

The management of communications port contention and power consumption affect the ease of use and the battery life of handheld computers. A typical handheld computer includes limited communications port resources. For example, the Palm V personal organizer has only one communications port available to interface with peripherals. When the communications port is exclusively occupied by a peripheral, the communications port is unavailable for other uses. For example, a handheld computer with an active keyboard occupying the communications port may be unable to perform an infrared data reception process with another handheld computer.

Another ease of use issue is the degree of user intervention required to manage a communications port. Requiring a user to manually open the communications port, for example through the graphical user interface or the buttons of the handheld computer, may be less preferable to automatically opening the communications port when the handheld computer receives information from a peripheral device. Further, requiring a user to explicitly close the communications port may be less preferable to automatically closing the communications port after the peripheral device and the handheld computer no longer exchange data. In one existing solution, the handheld computer will automatically close a communications channel, which was opened to work with a keyboard peripheral, when the handheld computer is prompted with a signal prompting a synchronization process, e.g. by a cradle for a HotSync™ process. However, if a user forgets to explicitly close the communications port after using a keyboard that occupied the communications port, the user may be unable to perform an infrared data reception process.

At best, the user is delayed with extra steps; at worst, the user may have the mistaken impression that the handheld computer has malfunctioned.

Requiring a user to manually close the communications port also affects power consumption. Battery powered systems, such as handheld computers, are sensitive to applications that drain excessive power. Thus, handheld computers mostly leave their communications ports in a low power standby mode. An open communications channel may consume significant power. For example, the Palm V personal organizer has a communications port included in the processor that is shared between an infrared communications port and an RS-232 serial communications port. The Palm V handheld organizer keeps these ports in standby to reduce power consumption. A user that forgets to close the communications port after a peripheral device is no longer used may suffer a significantly decreased battery life, and be forced to recharge or change batteries often.

Accordingly, what is needed is communications port management that eases port contention, helps conserve power, makes the handheld computer more user friendly, and accommodates multiple peripheral devices.

SUMMARY OF THE INVENTION

Various embodiments of the invention provide an improved method and apparatus for managing communications port contention and power consumption for a handheld computer, in particular those with a communications protocol that boosts power consumption when active, such as RS-232. The improved method provides communications channel management that automatically closes the communications channel. A communications channel includes interfaces coupling a peripheral with the handheld computer, and the communications port, which may be included in the processor of the handheld computer, or in an external device.

If the user of the handheld computer is finished using a peripheral utilizing the communications channel, yet forgets to manually close the communications channel, or fails to send a wake-up signal to the handheld computer, e.g., for a synchronization process such as a HotSync process, the communications channel still automatically closes. Limited communications channel resources are thereby made available, and power is conserved which would otherwise be squandered by maintaining a power hungry communications protocol that is not being used. The wake-up signal is part of a signal sent to a handheld computer to initiate a synchronization process for communicating data between the handheld computer and another computer. The wake-up signal also includes signals sent by non-cradle peripherals for initiating a communication of data with the handheld computer. The wake-up signal may cause the handheld computer to change from a lower power state to a higher power state.

In one embodiment, the handheld computer can be detachably coupled to a computer peripheral device via the communications port of the handheld computer. Various computer peripherals include a computer cradle for a synchronization process between the handheld computer and another computer, and other non-cradle peripherals, such as a modem, a keyboard, and a wireless communications device. The handheld computer receives a wake-up signal over the communications port. The wake-up signal may physically travel to the communications port through physical interfaces including a connector and an infrared interface. Responsive to receiving the wake-up signal, the handheld computer turns on, or changes to a high power state from a low power state. A communications channel is opened to the computer peripheral. Then, the computer peripheral is identified. If the computer peripheral is the cradle, then a synchronization function is performed between the handheld computer and another computer. If the computer peripheral is a non-cradle peripheral, then data is communicated with the non-cradle peripheral.

In various embodiments, the computer peripheral device is explicitly and implicitly identified. Identifying the computer peripheral assists the handheld computer in proceeding to the software and hardware functions appropriate for the particular computer peripheral, and in particular, the appropriate communications and power management functions.

In explicit identification, a computer peripheral sends a signal specifically identifying the computer peripheral.

In cases where the computer peripheral device can be limited to two possibilities, for example, a cradle and a non-cradle device such as a keyboard, implicit identification may be appropriate. Following the wake-up signal, the handheld computer waits for a device identification timeout period. If the handheld computer receives no data, then the handheld computer concludes that the cradle device sent the wake-up signal, and the synchronization process continues. If the handheld computer receives data, then the handheld computer concludes that the non-cradle device sent the wake-up signal, and executes a program appropriate for that non-cradle device.

In another embodiment, the handheld computer receives multiple wake-up signals, and identifies the particular type of computer peripheral from a number of wake-up signals received.

In various embodiments, the opened communications channel is closed in response to receiving some data from the peripheral device, and/or after a device timeout expires without the handheld computer receiving data from the computer peripheral device. If the communications channel can be opened relatively quickly and without consuming much power, the handheld computer may close the communications channel in response to receiving the data which prompted the sending of the wake-up signal. In another embodiment, the handheld computer waits for data until a timeout period ends, and if the handheld computer fails to receive data, or a group of data, from the computer peripheral device before an expiration of the timeout, the communications channel is closed.

Other aspects and advantages of the invention can be seen upon review of the figures, the detailed description, and the claims which follow.

DETAILED DESCRIPTION

A. SYSTEM OVERVIEW

Figure 1:
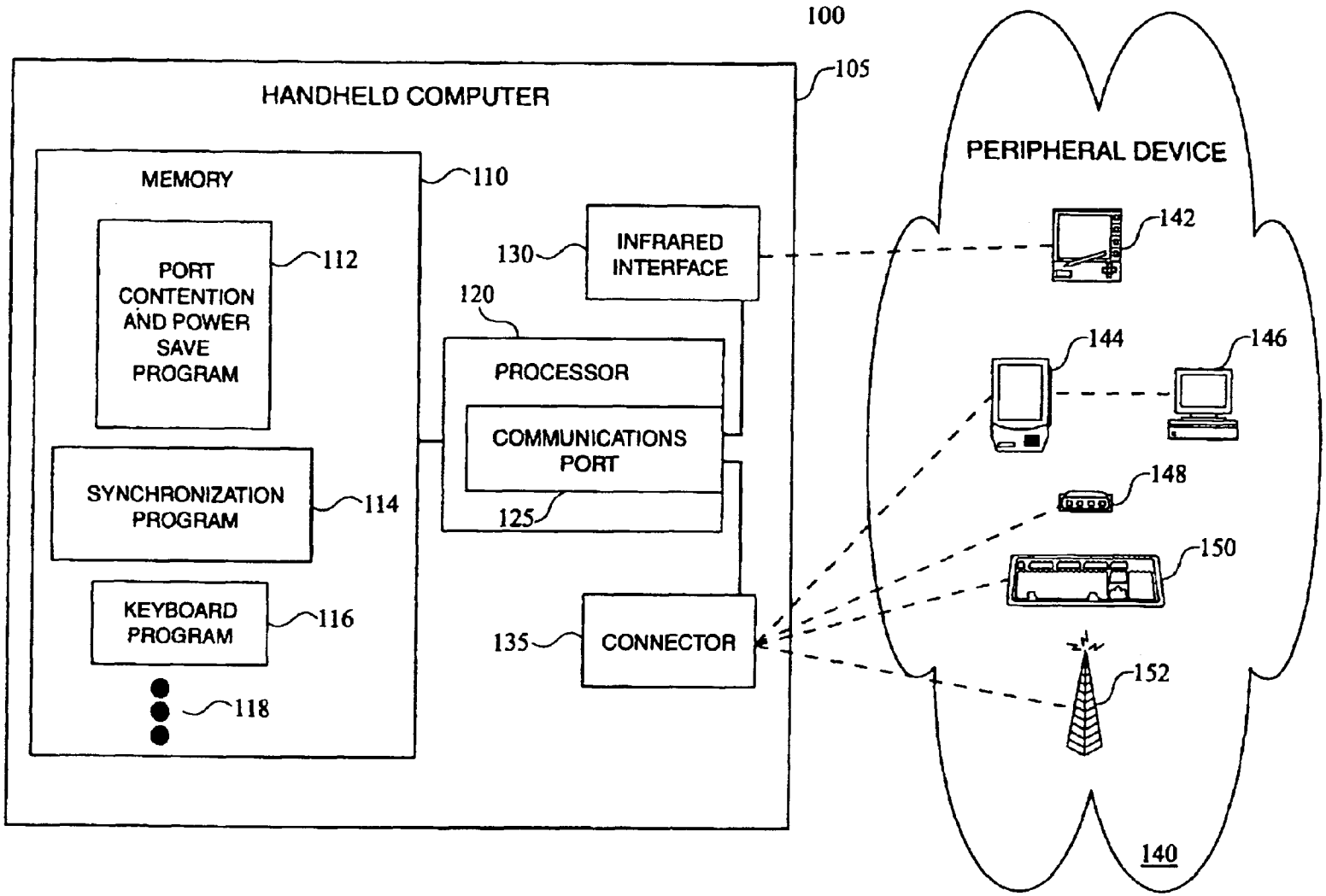
FIG. 1 is a block diagram of a system with the invention practicing port contention resolution and power consumption reduction including a handheld computer and a peripheral device.

A detailed description of the preferred embodiments of the invention is provided with reference to FIGS. 1–5. FIG. 1 shows a system practicing the invention. FIGS. 2–5 show flowcharts illustrating various process flows for practicing the invention.

Referring now to FIG. 1, a block diagram is shown of a system 100 practicing port contention resolution and power consumption reduction. The system 100 includes a handheld computer 105 and a peripheral device 140. Example embodiments of the handheld computer include handheld computers such as the Palm III, Palm IIIx, Palm IIIe, Palm V, Palm VII, PalmPilot Professional, PalmPilot Personal, pilot 1000, pilot 5000, and other handheld computers running a version of a PalmOS operating system. Other embodiments include other handheld computers, such as handheld computers running a version of a Windows CE operating system and handheld computers running a version of an EPOC operating system, and set-top boxes. Examples of peripherals include keyboards, cradles, modems, and other computers, such as handheld computers.

The handheld computer 105 includes a memory 110, a processor 120, an infrared interface 130, and a connector 135. The memory 110 includes various programs, sequences of instructions for execution on the processor 120. Example programs are a port contention and power consumption program 112, a synchronization program 114, and a keyboard program 116. Other programs 118 include programs for carrying out other internal functions of the handheld computer 105 and for carrying out functions appropriate with a peripheral device 140. Some of the programs may be included in drivers, the operating system, and/or applications.

The processor 120 includes a communications port 125. The handheld computer 105 communicates with the peripheral device 140 via one or more communications ports 125. One embodiment of the processor 120 is a DragonBall™ processor by Motorola. The Palm IIIx and Palm V handheld computers use a DragonBall processor model known as the DragonBall EZ MC68EZ238 Integrated Microprocessor. Other embodiments use a different microprocessor. The communications port 125 implemented in the DragonBall EZ includes one Universal Asynchronous Receive/Transmit (UART) serial port, Other embodiments of the invention implement multiple serial ports, one parallel port, multiple parallel ports, and other configurations.

Even if an embodiment is not limited to one communications port and includes multiple communication ports, the invention permits an increase in a total number of peripherals which the handheld computer may communicate with. Additionally, an embodiment including multiple communications ports has a larger scope of benefiting from power savings by minimizing power consumption of each communications port.

The communications port 125 communicates to the peripheral device 140 via a wired or wireless connection. An example of a wireless connection is a communication between two handheld computers 105 and 142 carried out in infrared through an infrared interface 130 coupled to the communications port 125. In infrared communication, an infrared transceiver included in the infrared interface 130 of the handheld computer 105 communicates with the infrared transceiver of another handheld computer 142. The transceivers follow an IrDA (Infrared Data Association) protocol. In other embodiments, other protocols are used.

Examples of a wired connection are communication between the handheld computer 105 and a cradle 144, through a connector 135 coupled to the communications port 125, and communication between the handheld computer 105 and a keyboard 150 through the connector 135 coupled to the communications port 125. This is the configuration that is often used to synchronize data between the handheld computer 105 and the computer 146.

In communication through the connector 135, one embodiment uses an electrical transceiver and a serial connector with 10 pins supporting EIA562 interface signals and RS-232 protocol communications, and additional signals for support of another peripheral device 140 such as a cradle 144, a modem 148, a keyboard 150, and a wireless communication device 152 such as a device compliant with a Bluetooth communication specification. Information on the Bluetooth communication specification is available on the Internet at the address www.bluetooth.com.

One possible configuration of the connector 135 supporting EIA562 interface signals and RS-232 protocol communications includes DTR (data terminal ready), VCC, RD (receive data), RTS (request to send), TD (transmit data), CTS (clear to send), GPI1 (HotSync initiation interrupt line), GPI2 (peripheral identification line for synchronization), a pin reserved for future designs, and SG (signal ground).

Another possible connector configuration of the connector 135 supporting EIA562 interface signals and RS-232 protocol communications includes DO (voltage doubler output or data terminal ready), VBATT+ (tied to the battery), RXD (receive data), RTS (request to send), TXD (transmit data), CTS (clear to send), I1 (HotSync initiation interrupt line), I2 (peripheral identification line for synchronization), a pin reserved for future designs, and SG (signal ground).

Other embodiments of the connector 135 include parallel connectors, different pin configurations, a different number of pins, and different connector signals including DSR (data set ready), RI (ring indicator), CD (carrier detect), and TC (transmitter clock).

One embodiment of the handheld computer 105 includes an electrical transceiver used in communication through the connector 135. When the electrical transceiver is shut down, the transceiver sends a low RS-232_V+ signal of 3.0 volts to the connector 135. In the Palm handheld organizer, the electrical transceiver is shutdown or in standby when the connector 135 is inactive, to conserve power and lengthen battery life for the handheld computer 105. When software running on the processor 120 of the handheld computer 105 opens the communications port 125, the transceiver is enabled and sends to the connector 135 an asserted signal, a high RS-232_V+ signal of 6.0 volts.

Other embodiments include communications protocols that are simplex and half duplex in addition to the full duplex RS-232 protocol. Other embodiments support RS-485, RS-422, IEEE-1284, IEEE-1394, and USB standards.

The peripheral device 140 could be another handheld computer 142, a cradle 144, a modem 148, a keyboard 150, or a wireless communication device 152. Other peripherals such as cellular, personal communication services, and other wireless devices including radio, infrared, and acoustic communication peripherals, and Bluetooth devices could be used. The peripheral device 140 includes circuitry for sending a wake-up signal to the handheld computer 142 through the connector 135 and circuitry for identifying to the handheld computer 142 a type of the peripheral device 140, and both types of circuitry are electrically coupled to the handheld computer 142 through the connector 135. The type of the peripheral device includes a non-cradle peripheral and a computer cradle. In other embodiments, the type of peripheral device includes another handheld computer 142, a cradle 144, a modem 148, a keyboard 150, or a wireless communication device 152, or a serial number or model number.

The cradle 144 holds and connects to the handheld computer 105. The cradle 144 couples the handheld computer and another computer 146 in a synchronization process, e.g. a HotSync process, to exchange information between the handheld computer 105 and the computer 146. During the synchronization process, the processor 120 executes the synchronization program 114.

FIG. 2, FIG. 3, FIG. 4, and FIG. 5 include methods of identifying the peripheral device coupled to the handheld computer 105 and methods of deciding how much data to receive before closing an open communications channel. The described process flows describe various solutions to multiple problems: 1) sharing a limited number of communications ports, 2) conserving power by limiting a duration of an opened communications port, and 3) identifying a peripheral device coupled to the communications port.

The uses of a cradle and a keyboard are exemplary and the methods are not limited to those peripheral devices. For example, explicit references to a keyboard and keyboard data may be replaced with references to another peripheral device, such as a modem and modem data. Some of the various steps are not limiting or exclusive and thus may be exchanged in order, deleted, and accept additional steps.

Figure 3:
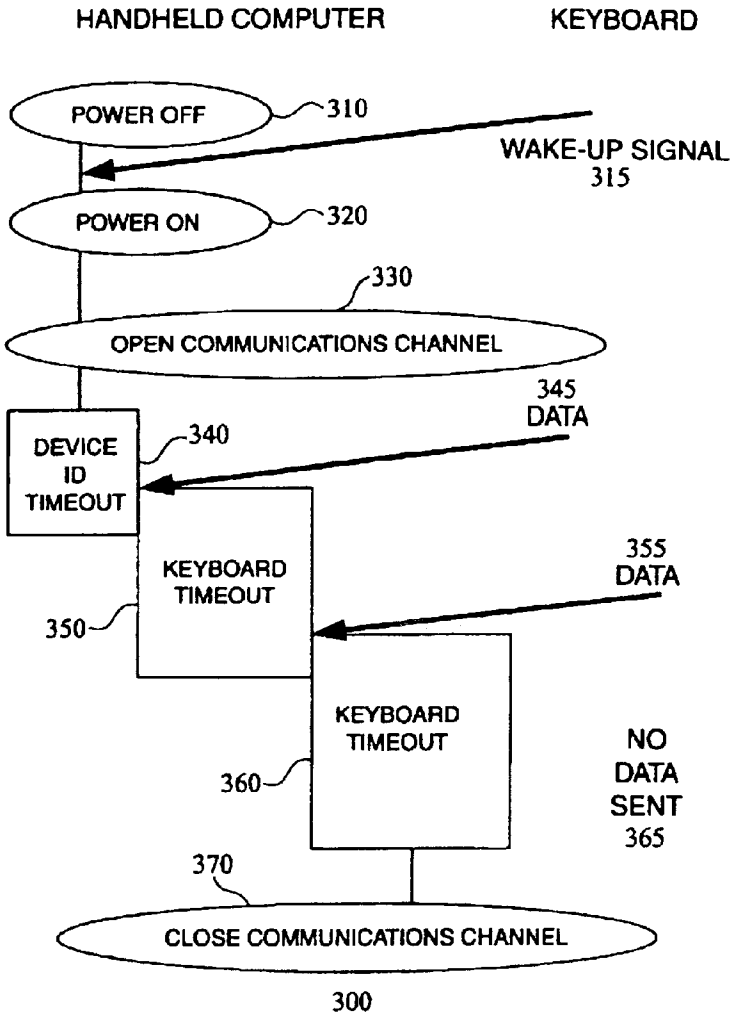
FIG. 3 is a flowchart showing implicit device identification with a device identification timeout period and a timeout channel shutdown between a handheld computer and a keyboard.
Figure 2:
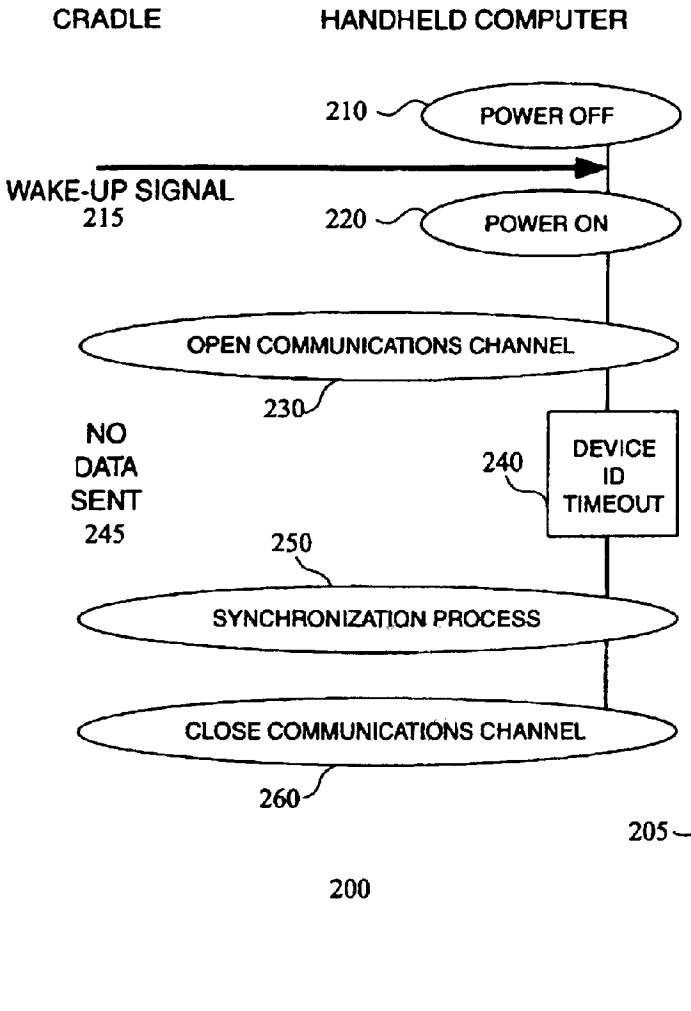
FIG. 2 is a flowchart showing implicit device identification between a handheld computer and a computer cradle with a device identification timeout period.

Referring now to FIG. 2 and FIG. 3, a flow chart 200 and a flow chart 300 shows example process flows of port contention and power consumption reduction. FIG. 2 and FIG. 3 both illustrate implicit device identification between a handheld computer 105 and a peripheral device. Flowchart 200 illustrates implicit device identification between a handheld computer 105 and a cradle 144, and flowchart 300 illustrates implicit device identification between a handheld computer 105 and a keyboard 150. In both flowcharts 200 and 300, the time axis 205 advances from the top of the figure to the bottom of the figure.

Note, these examples presume that only one device is connected to the connector 135. However, other embodiments allow multiple devices to be simultaneously connected to the connector 135.

Referring to the flow chart 200, the cradle sends a wake-up signal 215 to the handheld computer 105. This wake-up signal is part of the start of a synchronization process. Responsive to receiving the wake-up signal 215, the handheld computer 105 changes from a power off state 210 to a power on state 220. Then, the handheld computer 105 opens a communications channel 230 over the communications port 125. Opening a communications channel includes preparing software and hardware on the handheld computer 105 for active communication with another device, e.g. initializing a serial library including setting up global variables and turning on RS-232 drivers including setting hand-shaking signals.

At this point, the processor 120 of the handheld computer 105 is unaware of the type of peripheral device that sent the wake-up signal 215. The system 100 can inform the handheld computer 105 implicitly or explicitly about the type of peripheral device sending the wake-up signal 215. Another method can count a number of wake-up signals sent by a peripheral device to identify the peripheral device sending the wake-up signal.

In flow chart 200, an implicit method is used. The implicit method enjoys the advantage of backward compatibility for a system 100 not equipped with explicit identification abilities. Older peripherals lacking explicit identification ability can use implicit identification after software for the handheld computer 105 is upgraded. To decide the type of peripheral device, the handheld computer 105 waits for a device identification timeout period 240. During this device identification timeout period 240, either the handheld computer 105 will receive data or not receive data.

In the case of the cradle 144 sending the wake-up signal 215, no data is sent 245 by the cradle 144 before the device identification timeout period 240 expires. The handheld computer 105 implicitly decides that the cradle 144 is the source of the wake-up signal 215. The handheld computer 105 continues to the synchronization process 250. Following the synchronization process 250, the handheld computer 105 closes the communications channel 260. Closing the communications channel includes freeing some or all of the hardware and software resources used in opening the communications channel, e.g. freeing the communications port 125 and turning off the RS-232 drivers. In another embodiment, the handheld computer 105 implicitly decides that the keyboard 150 is the source of the wake-up signal when no data is sent 245 before the device identification timeout period 240 expires.

Referring to the flow chart 300, the keyboard 150 sends a wake-up signal 315 to the handheld computer 105. In one embodiment, to send the wake-up signal the keyboard couples two pins of the handheld computer connector, for example coupling VBATT+ and II, or coupling pins VCC and GP1.

Responsive to receiving the wake-up signal 315, the handheld computer 105 changes from a power off state 310 to a power on state 320. The handheld computer 105 opens a communications channel 330 over the communications port 125. In one embodiment, the handheld computer opens a communications port for exclusive use between the handheld computer 105 and the keyboard 150, activates software RS-232 drivers, and initiates high power mode to permit RS-232 protocol communications between the keyboard 150 and the handheld computer 105.

At this point the processor 120 of the handheld computer 105 is unaware of the type of peripheral device which sent the wake-up signal 315. To decide the type of peripheral device, the handheld computer 105 waits for a device identification timeout period 340. In one embodiment, the software of the handheld computer 105 is adapted to respond to the wake-up signal 315 so that the handheld computer 105 that would otherwise continue with a synchronization process waits for data. During this device identification timeout period 340, either the handheld computer 105 will receive data or not receive data.

In the case of the keyboard 150 sending the wake-up signal 315, the keyboard 150 sends keyboard data 345 before the device identification timeout period 340 expires. The keyboard data may be received over one or more pins of the connector 135. The keyboard 150 may be designed to send the keyboard data after the process of opening the communications channel is complete. Because of the keyboard data, the handheld computer 105 implicitly decides that the keyboard 150 is the source of the wake-up signal 315. At this point, the handheld computer 105 can continue to one of several options prior to closing the communications channel. For example, the handheld computer 105 can continue to maintain an open communications channel while a timeout period does not expire without the handheld computer receiving data from the computer keyboard data, or the handheld computer 105 can close the communications channel immediately. The example in flowchart 300 uses the timeout period method. In another embodiment, the handheld computer 105 implicitly decides that the cradle 144 is the source of the wake-up signal 315 responsive to the handheld computer 105 receiving data.

Referring again to the flow chart 300, responsive to receiving the keyboard data 345 before the expiration of device identification timeout 340, the handheld computer 105 initiates a keyboard timeout 350. Responsive to receiving the keyboard data 345 prior to the expiration of keyboard timeout 350, the handheld computer 105 starts keyboard timeout 360. The keyboard 150 sends no data 365 prior to the expiration of the keyboard timeout 360, and the handheld computer 105 closes the communications channel 370. The handheld computer 105 powers down the RS-232 port, and RS-232 communications between the keyboard 150 are ended, freeing the communications port 125 to communicate with another computer peripheral or to reinitiate RS-232 communications with the keyboard 150. At 315 note that the handheld computer 105 may not have to power itself on step 330 because it may still be on, but the communications port would need to be opened again.

The duration of keyboard timeouts 350 and 360 can be longer than the duration of device identification timeout 340. In one embodiment, a keyboard 150 will send a wake-up signal when a user has typed a key. Keyboard data may be buffered and sent to the handheld computer 105, e.g. after the communications port is opened 330. The device identification timeout 340 can be relatively brief, having only to retrieve this buffered keyboard data. In one embodiment, the device identification timeout 340 is 10–500 milliseconds. Subsequent keyboard timeouts 350 and 360 are dependent on human typing speeds.

Figures 4, 5:
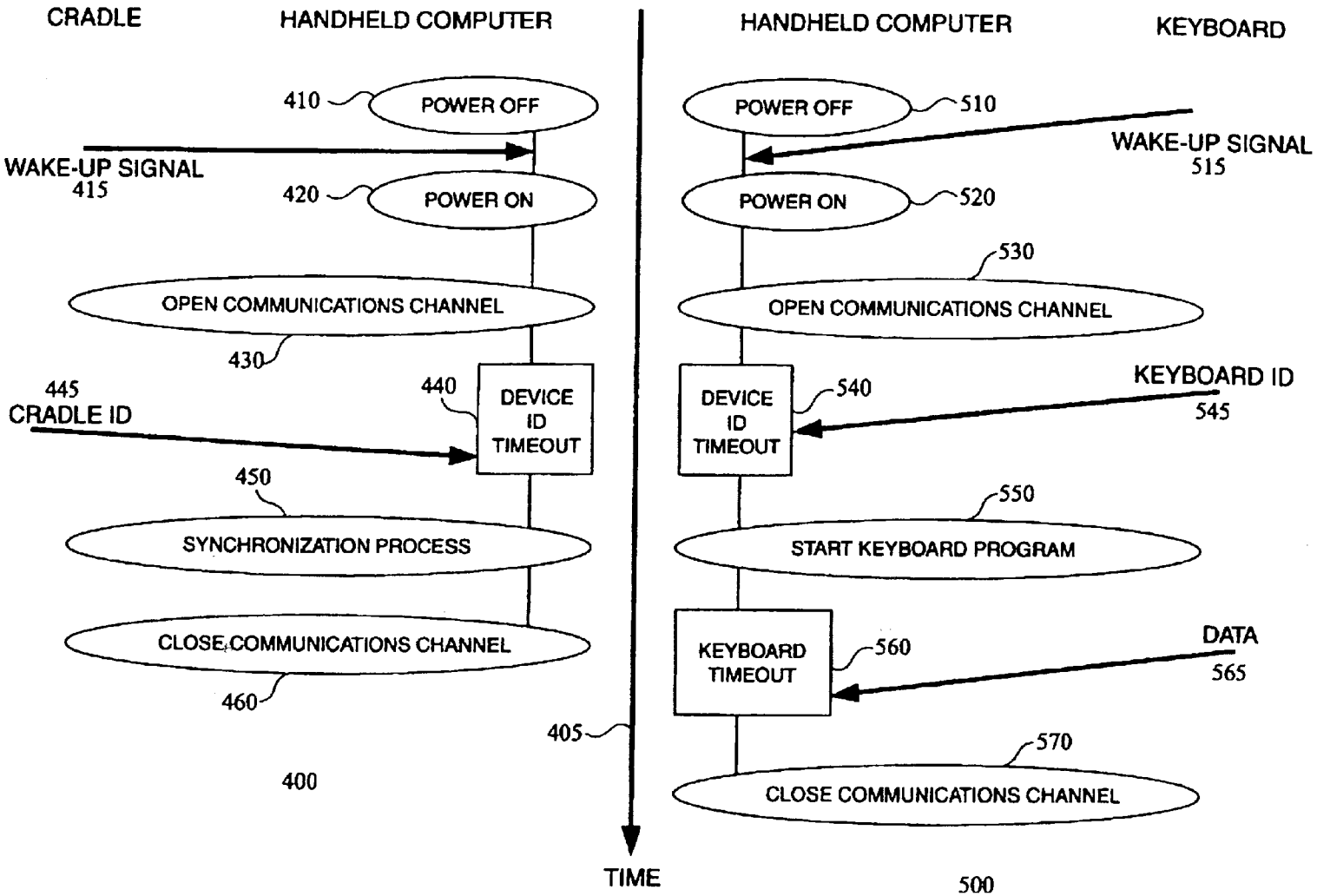
FIG. 4 is a flowchart showing explicit device identification between a handheld computer and a computer cradle.
FIG. 5 is a flow chart showing explicit device identification with an immediate channel shutdown between a handheld computer and a keyboard.

Referring now to FIG. 4 and FIG. 5, a flow chart 400 and a flow chart 500 shows example process flows of port contention and power consumption reduction. Flowcharts 400 and 500 both illustrate explicit device identification between a handheld computer 105 and a peripheral device. Flowchart 400 illustrates explicit device identification between a handheld computer 105 and a cradle 144, and flowchart 500 illustrates explicit device identification between a handheld computer 105 and a keyboard 150. In both flowcharts 400 and 500, the time axis 405 advances from the top of the figure to the bottom of the figure.

Referring to the flow chart 400 of FIG. 4, the cradle 144 sends a wake-up signal 415 to the handheld computer 105. Responsive to receiving the wake-up signal 415, the handheld computer 105 changes from a power off state 410 to a power on state 420. The handheld computer 105 opens a communications channel 430 over the communications port 125.

To decide the type of peripheral device that sent the wake-up signal 415, the handheld computer 105 waits for a device identification timeout period 440. During this device identification timeout period 440, the handheld computer 105 awaits an identification signal that explicitly indicates the type of peripheral device that sent the wake-up signal 415. This period is optional but may help where both explicit and implicit device identification peripherals are used in the system 100. A device identification signal can be a signal sent on the same or different pin of the connector 135 as the pin for sending a wake-up signal. The device identification signal can send a device identification, vary a voltage, current, or other amplitude or modulation that corresponds to the type of peripheral device sharing the communications channel with the handheld computer 105. A look-up table storing the corresponding device types may be stored in the memory 110 of the handheld computer 105. Explicit identification enjoys the advantage of not making the high power RS-232 mode necessary. If the device identification signal indicates a type of peripheral that does not use the RS-232 protocol, then the RS-232 drivers are not activated and power is conserved. For example, a peripheral device communicating over the infrared interface 130 may not require RS-232 protocol communications.

In the case of the cradle 144 sending the wake-up signal 415, a cradle identification signal is sent 445 by the cradle 144 before the device identification timeout period 440 expires. The handheld computer 105 receives explicit information that the cradle 144 is the source of the wake-up signal 415. The handheld computer 105 proceeds to execute the synchronization program 114 and continues with the synchronization process 450. The handheld computer 105 then closes the communication channel 460.

Referring to the flow chart 500 of FIG. 5, the keyboard 150 sends a wake-up signal 515 to the handheld computer 105. Responsive to receiving the wake-up signal 515, the handheld computer 105 changes from a power off state 510 to a power on state 520. The handheld computer 105 opens a communications channel 530 over the communications port 125.

To decide the type of peripheral device which sent the wake-up signal 515, the handheld computer 105 waits for a device identification timeout period 540. During this device identification timeout period 540, the handheld computer 105 awaits an identification signal that explicitly indicates the type of peripheral device that sent the wake-up signal 515. In the case of the keyboard 150 sending the wake-up signal 515, a keyboard identification signal is sent 545 by the keyboard 150 before the device identification timeout period 540 expires. The handheld computer 105 receives explicit information that the keyboard 150 is the source of the wake-up signal 515. The handheld computer 105 starts the keyboard program 550 and proceeds to execute the keyboard program 116.

At this point, the handheld computer 105 can continue to one of several options prior to closing the communications channel. In flow chart 500, the handheld computer 105 continues with a keyboard timeout period 560. Data is received from the keyboard 150 within the keyboard timeout period 560 and the communications channel is closed 570. The keyboard timeout period 560 can be optional because the keyboard communication channel is only opened when key data is received, and the communication channel is immediately shut down upon receiving key data.

Whether the handheld computer 105 immediately closes the communications channel or executes multiple consecutive keyboard timeouts depends on factors including the time duration and power drain of opening the communications channel and activating the RS-232 drivers. For example, if the handheld computer can execute the necessary software and open the communications channel with sufficient speed and without a power consumption penalty, the communications channel may be opened and closed for each keystroke or group of keystrokes from the keyboard 150. In the event that the communications channel is immediately closed, the keyboard 150 can be adapted to send a wake-up signal automatically with every keystroke or group of keystrokes, or adapted to send a wake-up signal after a time-out expires.

B. CONCLUSION

The foregoing description of various embodiments of the invention has been presented for purposes of illustration and description. It is not intended to limit the invention to the precise forms disclosed. Many modifications and equivalent arrangements will be apparent.

What is claimed is:

1. A method of managing a communications port in a handheld computer, the handheld computer being detachably coupled in communication to one or more computer peripherals via the communications port, each of the computer [peripheral] *peripherals* being one of a cradle or a non-cradle peripheral, the method comprising:

receiving a wake-up signal over the communications port corresponding to one of the one or more computer peripherals being directly connected to the handheld computer;

responsive to receiving the wake-up signal, causing the handheld computer to change to a high power state from a low power state;

opening a communications channel to the computer peripheral;

identifying the computer peripheral;

if the computer peripheral is the cradle, then performing a synchronization function and automatically closing the communication channel; and if the computer peripheral is the non-cradle peripheral, then receiving data and automatically closing the communications channel *while the handheld computer is powered on*.

2. The method of claim 1, wherein identifying the computer peripheral includes receiving a signal from the computer peripheral, wherein a first amplitude of the signal corresponds to the cradle, and a second amplitude of the signal corresponds to the non-cradle peripheral.

3. The method of claim 1, wherein identifying the computer peripheral includes waiting for the data for a predetermined time period, and so that not receiving the data within the predetermined time period is determined to correspond to the cradle, and receiving the data within the predetermined time period is determined to correspond to the non-cradle peripheral.

4. The method of claim 1, wherein automatically closing the communications channel occurs in response to receiving the data.

5. The method of claim 1, wherein automatically closing the communications channel occurs in response to receiving no further data within a predetermined time period.

6. The method of claim 1, wherein in the high power slate the handheld computer supports RS-232 protocol communications and in the low power state the handheld computer does not support RS-232 protocol communications.

7. A system for managing peripheral communications, the system comprising:

a handheld computer having a high power state and a low power state, the handheld computer including:

a communications port; and a connector coupled to the communications port; and a computer peripheral, detachably coupled with the communications port of the handheld computer through the connector, the computer peripheral having a type, the computer peripheral adapted to send a wake-up signal to the handheld computer through the connector upon the computer peripheral is connected to the handheld computer, the handheld computer being configured to identify from the computer peripheral the type of the computer peripheral as being one of:

a cradle for performing a synchronization function, and a non-cradle peripheral for sending data to the handheld computer, wherein the wake-up signal causes the handheld computer to i) change from the low power state to the high power state, ii) open a communications channel with the computer peripheral via the communications port, and iii) automatically close the communications channel *while the handheld computer is powered on*.

8. The system of claim 7, wherein the computer peripheral is adapted to identify to the handheld computer the type of the computer peripheral by sending a signal from the computer peripheral, wherein a first amplitude of the signal corresponds to the cradle, and a second amplitude of the signal corresponds to the non-cradle peripheral.

9. The system of claim 7, wherein the computer peripheral is adapted to identify to the handheld computer the type of the computer peripheral by:

i) not sending data within a predetermined time period if the type of the computer peripheral corresponds to the cradle, and ii) sending data within the predetermined time period if the type of the computer peripheral corresponds to the non-cradle peripheral.

10. The system of claim 7, wherein the handheld computer automatically closes the communications channel in response to receiving data from the computer peripheral.

11. The system of claim 7, wherein the handheld computer automatically closes the communications channel in response to:

i) receiving data from the computer peripheral, and then ii) receiving no further data from the computer peripheral within a predetermined time period.

12. A computer peripheral for sending data to a handheld computer in a system for managing a communications port, the computer peripheral having a type, the handheld computer having a high power state and a low power state, the handheld computer including the communications port and a connector coupled to the communications port, and the computer peripheral detachably coupled with the communications port of the handheld computer through the connector, the computer peripheral comprising:

a first circuit for sending a wake-up signal to the handheld computer through the connector, and the first circuit electrically couplable to the connector, and the wake-up signal causing the handheld computer to i) change from the low power state to the high power state, ii) open a communications channel with the computer peripheral via the communications port, and iii) automatically close the communications channel *while the handheld computer is powered on*; and a second circuit for identifying to the handheld computer the type of the computer peripheral as a non-cradle peripheral, and the second circuit electrically couplable to the connector.

13. The computer peripheral of claim 12, wherein the computer peripheral identifies to the handheld computer the type of the computer peripheral by sending a signal from the computer peripheral, and the signal having an amplitude corresponding to the non-cradle peripheral.

14. The computer peripheral of claim 12, wherein the computer peripheral identifies to the handheld computer the type of the computer peripheral by sending data within a predetermined time period.

15. The computer peripheral of claim 12, wherein the handheld computer automatically closes the communications channel in response to receiving data from the computer peripheral.

16. The computer peripheral of claim 12, wherein the handheld computer automatically closes the communications channel in response to:

i) receiving data from the computer peripheral, and then ii) receiving no further data from the computer peripheral within a predetermined time period.

17. The computer peripheral of claim 12, wherein the computer peripheral is a keyboard.

18. The computer peripheral of claim 12, wherein the computer peripheral is a device compliant with a Bluetooth communication specification.

19. The computer peripheral of claim 12, wherein the computer peripheral is a modem.

20. An apparatus for managing a communications port in a computer, the computer being detachably coupled in communication to in communication to one or more computer peripherals via the communications port, each of the computer peripheral being one of a cradle or a non-cradle peripheral, the apparatus comprising:

means for receiving a wake-up signal over the communications port corresponding to one of the one or more computer peripherals being directly connected to the handheld computer;

means for causing the computer to change to a high power state from a low power state, responsive to receiving the wake-up signal;

means for opening a communications channel to the computer peripheral;

means for identifying the computer peripheral; and at least one of:

means for performing a synchronization function if the computer peripheral is the cradle, then automatically closing the communication channel; and means for receiving data and automatically closing the communications channel if the computer peripheral is the non-cradle peripheral *while the handheld computer is powered on*.

*21. A method of managing a communications port associated with a computing device, the method comprising:*

*receiving a wake-up signal over the communications port corresponding to a peripheral connected to the computing device;*

*responsive to receiving the wake-up signal, causing the computing device to change from a low power state to a high power state;*

*opening a communications channel to the peripheral;*

*if the peripheral can be synchronized with the computing device, then performing a synchronization function;*

*if the computer peripheral cannot be synchronized with the computing device, then communicating data between the computing device and the peripheral; and*

*automatically closing the communications channel upon completion of the synchronization function or data communication while the computing device is powered on.*

*22. The method of claim 21, further comprising, after performing a synchronization function, automatically closing the communication channel.*

*23. The method of claim 21, further comprising, after communicating data between the computing device and the peripheral, automatically closing the communication channel.*

*24. The method of claim 21, wherein the peripheral is one of a cradle and a non-cradle peripheral.*

*25. The method of claim 21, further comprising:*

*identifying the peripheral by receiving a signal from the peripheral, wherein an amplitude of the signal corresponds to a type associated with the peripheral.*

*26. The method of claim 25, wherein the type of peripheral is one of a cradle and a non-cradle peripheral.*

*27. The method of claim 21, further comprising:*

*identifying the peripheral by waiting for the data for a predetermined time period.*

*28. The method of claim 27, wherein receiving the data within the predetermined time period corresponds to identifying whether the peripheral is one of a cradle peripheral and a non-cradle peripheral.*

*29. The method of claim 21, wherein automatically closing the communications channel occurs in response to receiving the data.*

*30. The method of claim 21, wherein automatically closing the communications channel occurs in response to receiving no further data within a predetermined time period.*

*31. The method of claim 21, wherein in the high power state the computing device supports communication using a communication channel and in the low power state the handheld computer does not communication over the communication channel.*

*32. A computing device comprising:*

*means for receiving a wake-up signal over a communications port corresponding to a peripheral connected to the computing device;*

*means for causing the computing device to change from a low power state to a high power state upon receiving the wake-up signal;*

*means for opening a communications channel to the peripheral;*

*means for synchronizing if the peripheral can be synchronized with the computing device; and*

*means for communicating data between the computing device and the peripheral if the peripheral cannot be synchronized with the computing device; and*

*automatically closing the communications channel upon completion of the synchronization function or data communication while the computing device is powered on.*

*33. The computing device of claim 32, further comprising means for automatically closing the communication channel after synchronization.*

*34. The computing device of claim 32, further comprising means for automatically closing the communication channel after communicating data between the computing device and the peripheral.*

*35. The computing device of claim 32, the computing device being configured to identify that the connected peripheral is one of: a peripheral that performs a synchronization function and a peripheral for communicating data with the computing device.*

*36. The computing device of claim 32, wherein, if the computing device cannot be synchronized with the peripheral, then the computing device automatically closes the communications channel in response to receiving data from the peripheral and then receiving no further data from the peripheral within a predetermined time period.*

*37. A peripheral device for sending data to a computing device comprising:*

*(1) a first module that sends a wake-up signal to the computing device causing the computing device to:*

*(a) change from a low power state to a high power state; and*

*(2) a second module that identifies to the computing device whether the peripheral device is of a type that can synchronize with the computing device or not synchronize with the computing device;*

*wherein the computing device is adapted to automatically close a communications channel with the peripheral device while the computing device is powered on.*

*38. The peripheral device of claim 37, wherein the peripheral device identifies to the computing device the type of the peripheral device by one of: sending a signal having an amplitude associated with its synchronization capability or sending data within a predetermined time period.*

*39. The peripheral device of claim 37, wherein the computing device automatically closes the communications channel in response to receiving data from the peripheral device.*

*40. The peripheral device of claim 37, wherein the computing device automatically closes the communications channel in response to receiving data from the peripheral device and then receiving no further data from the peripheral device within a predetermined time period.*

*41. The peripheral device of claim 37, wherein the peripheral device is one of a keyboard, a device compliant with a Bluetooth protocol and a modem.*

*42. A computing device comprising:*

*a module that receives a wake-up signal over a communications port corresponding to a peripheral connected to the computing device;*

*a module that causes the computing device to change from a low power state to a high power state upon receiving the wake-up signal;*

*a module that opens a communications channel to the peripheral;*

*a module that synchronizes the computing device with the peripheral if the peripheral can be synchronized with the computing device; and*

*a module that communicates data between the computing device and the peripheral if the peripheral cannot be synchronized with the computing device; and*

*a module that automatically closes the communication channel after either the synchronization or communication of data while the computing device is powered on.*

*43. The computing device of claim 42, the computing device being configured to identify that the connected peripheral is one of: a peripheral that performs a synchronization function and a peripheral for communicating data with the computing device.*

*44. The computing device of claim 42, wherein, if the computing device cannot be synchronized with the peripheral, then the computing device automatically closes the communications channel in response to receiving data from the peripheral and then receiving no further data from the peripheral within a predetermined time period.*

*45. A computer-readable medium storing instructions for controlling a computing device to perform the steps:*

*receiving a wake-up signal over the communications port corresponding to a peripheral connected to the computing device;*

*responsive to receiving the wake-up signal, causing the computing device to change from a low power state to a high power state;*

*opening a communications channel to the peripheral;*

*if the peripheral can be synchronized with the computing device, then performing a synchronization function; and*

*if the computer peripheral cannot be synchronized with the computing device, then communicating data between the computing device and the peripheral; and*

*automatically closing the communications channel after either the synchronization or communication of data between the computing device and peripheral while the computing device is powered on.*

* * * * *